Figure 1:
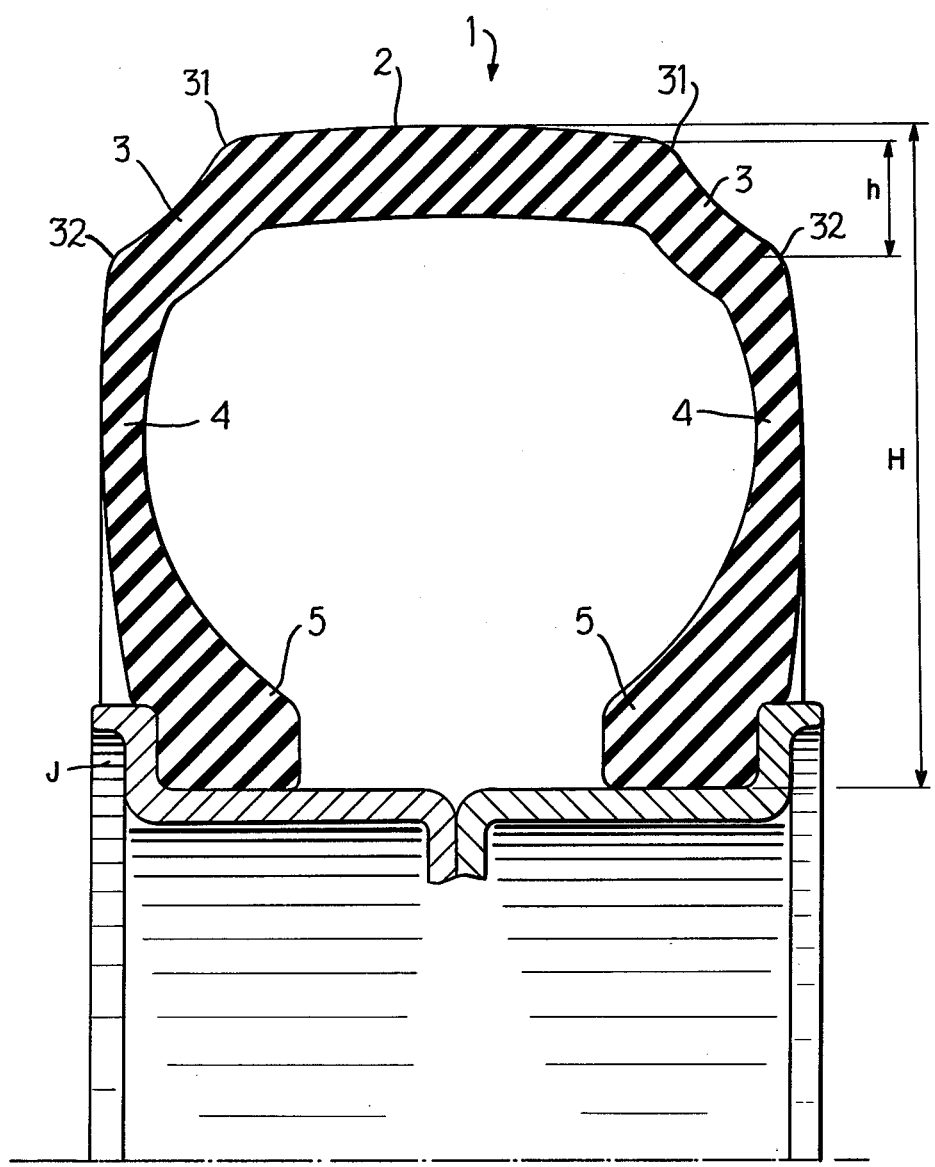

United States Patent [19]
Boileau et al.

[11] 4,088,168
[45] May 9, 1978

[54] TIRE HAVING CONCAVE SHOULDERS

[75] Inventors: Jacques Boileau, Clermont-Ferrand; Albert Mathevet, Chamalieres, both of France

[73] Assignee: Compagnie Generale des Etablissements Michelin, Clermont-Ferrand, France

[21] Appl. No.: 693,968

[22] Filed: Jun. 7, 1976

[30] Foreign Application Priority Data
Jun. 12, 1975 France .................................. 75 18482

[51] Int. Cl.² .................................................... B60C 11/04
[52] U.S. Cl. .................................. 152/352 R; 152/357 A
[58] Field of Search ............... 152/353 C, 353 R, 352, 152/209 R, 354, 355, 357 A

[56] References Cited
U.S. PATENT DOCUMENTS
597,569  1/1898  Van Zandt ........................ 152/352
1,339,868  5/1920  Subers ............................ 152/353 R FOREIGN PATENT DOCUMENTS
1,073,332  1/1960  Germany ......................... 152/353 R Primary Examiner—Drayton E. Hoffman
Assistant Examiner—Donald W. Underwood
Attorney, Agent, or Firm—Brumbaugh, Graves, Donohue & Raymond

[57] ABSTRACT

A tire of elastic material, which is at least partially without reinforcement, is formed of a tread with a shoulder on both sides thereof, each shoulder being extended by a sidewall which terminates in a bead. In accordance with the invention, the shoulders are formed by a zone whose circumferential deformations, for a deflection of the tire of between 0% and 30% of the height of the tire on the rim, are substantially equal to the radial deformations of said zone, the tire being mounted on a rim and inflated.

4 Claims, 2 Drawing Figures

TIRE HAVING CONCAVE SHOULDERS

The present invention relates to improvements in tires and more particularly to tires which are partially or entirely without reinforcement.

In tires of this type it is important that the elastomeric mass forming such tires be distributed in judicious and economic fashion. For this purpose, it has been proposed to impart at least one reversal of curvature of the median line in the sidewall of the tire, as seen in radial section. In this way a beneficial deconcentration of the stresses is obtained. Nevertheless the shear stresses of the elastic mass are considered to be the most harmful.

The present invention proceeds from the fact that the shearing comes from the inequality of the principal deformations which, in the present case, are the radial deformation ($\epsilon_r$) and the circumferential deformation ($\epsilon_c$) at a given point of the tire.

The object of the present invention is thus to do away with the shear stresses, at least in the zones in which the tire suffers the greatest deformations. These zones are two in number and are formed by the shoulders, that is to say the connecting zones between the tread and the sidewalls.

The practical problem therefore consists in introducing some suitable means of equalizing said deformations of the shoulders or at least minimizing them.

The tire in accordance with the present invention, which comprises a tread extended on both sides by a shoulder followed by a sidewall terminating in a bead, which tire consists of elastic material and is at least partially without reinforcement, is characterized by the fact that the shoulders are formed by a zone whose circumferential deformations, for a deflection of the tire of between 0% and 30% of its height H on the rim, are substantially equal to the radial deformations of said zone, the tire being mounted on a rim and inflated.

The tire in accordance with the invention can be made either of a single elastic material or of several different elastic materials. In particular, the tread may be formed of different elastic materials superimposed in radial direction.

The invention will be easily understood by reference to the drawing and the following description.

Figure 2:
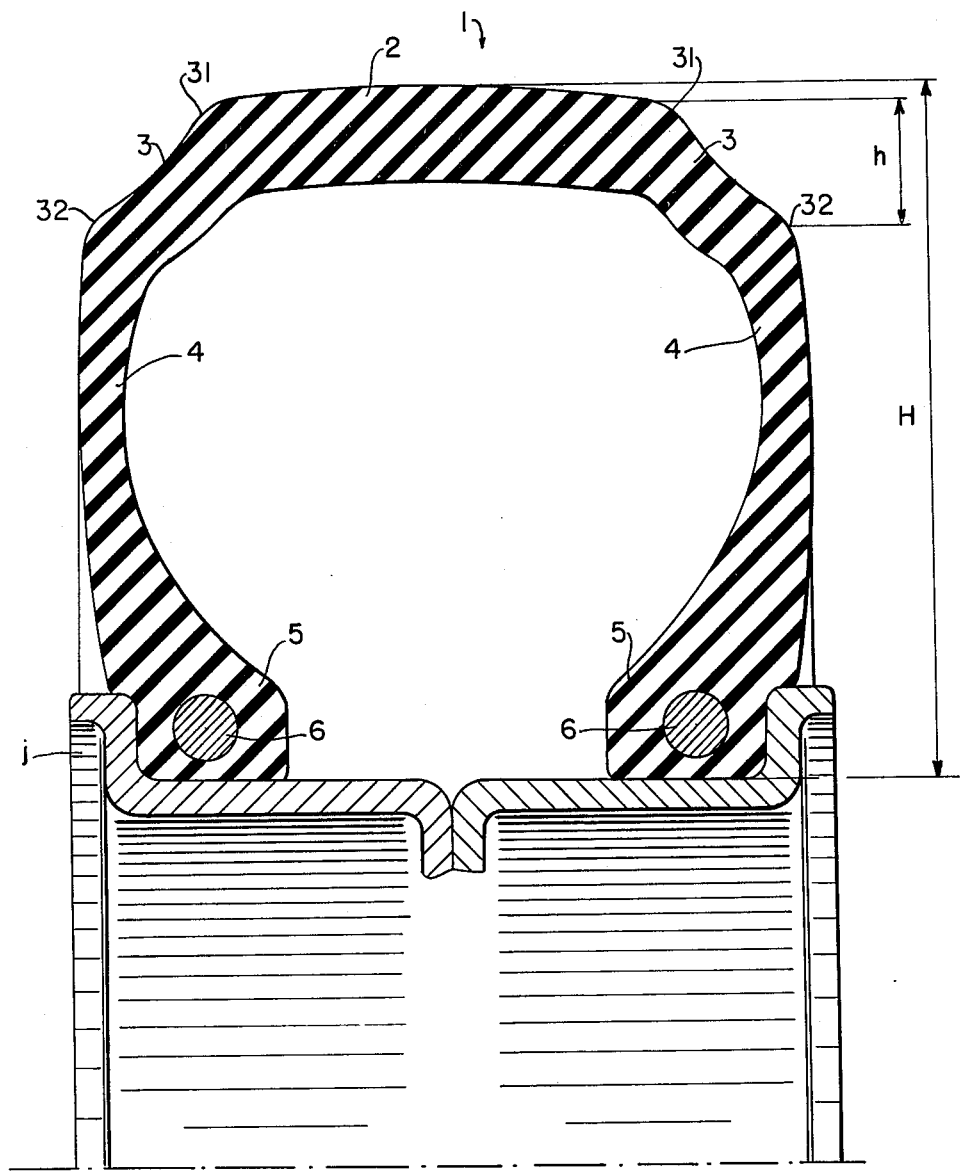

FIGS. 1 and 2 of the drawing and the description thereof illustrate, by way of examples, two embodiments of the invention.

FIGS. 1 and 2 of the drawing show a tire 1 in accordance with the invention, seen in radial section. The tire of FIG. 1 has no reinforcement and it consists of a tread 2 of substantially constant thickness, shoulders 3, sidewalls 4 and beads 5. As can be seen, each of the shoulders 3 has the shape of a concave zone of constant thickness defined by two slightly rounded outer edges 31 and 32, but nevertheless one of said edges clearly marking the edge of the tread and the other the radially upper end of the sidewall 4.

In certain cases it is sufficient to impart a zero curvature of this zone 3. However, the average curvature of this concavity may advantageously be between the preceding limit (zero curvature) and (1/0.2H), in which H is the height of the tire on the rim J, as defined by the standard of the American Tire and Rim Association. Preferably, the said concave zone extends over a radial height h which is between 5% and 40% of the height H of the tire on the rim J. The average curvature is the curvature 1/R of the circle of radius R passing through the three following points of the median line of said concave zone, as seen in radial section, namely the two points where the said median line penetrates into the sidewall 4, on the one hand, and into the tread 2, on the other hand, and the point equidistant from said two points.

Due to this configuration of the shoulders, a minimizing of the shear in said zones is obtained. As can be seen, the beads 5 are relatively wide in axial direction. This axial width is between 25% and 50% of the width of the rim. Such an arrangement assures a firm seat of the tire on the rim which supports it, despite the absence of a reinforcement. In certain cases, it may be advantageous to include a bead ring 6 (as shown in FIG. 2) or a reinforcement equivalent to a bead ring in each bead, particularly when it is desired to reduce the axial width of the beads while retaining a satisfactory connection between the tire and the rim. Such a tire whose beads are provided with a bead ring is nevertheless to be considered a nonreinforced tire. In fact, the bead rings serve in this case merely to assure sufficient adherence of the tire on the rim to avoid the rotating or slipping of the tire along the rim and possibly leakage of inflation air in the event that the tire is of the type which does not have a separate inner tube.

What is claimed is:

1. A tire of elastic material, which tire is at least partially without reinforcement and comprises a tread extended on both sides by a shoulder followed by a sidewall terminating in a bead, characterized by the fact that the shoulders are without reinforcement and are each formed of a concave zone extending from the edge of the tread to the radially upper end of the sidewall, said concave zone having an average curvature which is between 0 and (1/0.2H), H being the height of the tire on a rim, said concave zone extending over a radial height h which is equal to between 5% and 40% of the height H of the tire on a rim, the circumferential deformations of said concave zone, for a deflection of the tire of between 0% and 30% of its height H on the rim, are substantially equal to the radial deformations of said concave zone, the tire being mounted on a rim and inflated.

2. The tire according to claim 1, characterized by the fact that the said concave zone is of constant thickness.

3. The tire according to claim 1, characterized by the fact that the beads have an axial width which is between 25% and 50% of the width of the rim.

4. The tire according to claim 1, characterized by the fact that the bead has a bead ring.

* * * * *